May 8, 1951     J. GOLLBACH ET AL     2,552,093
ROTARY DISCHARGE MECHANISM FOR DRIERS
Filed June 28, 1946     3 Sheets-Sheet 1
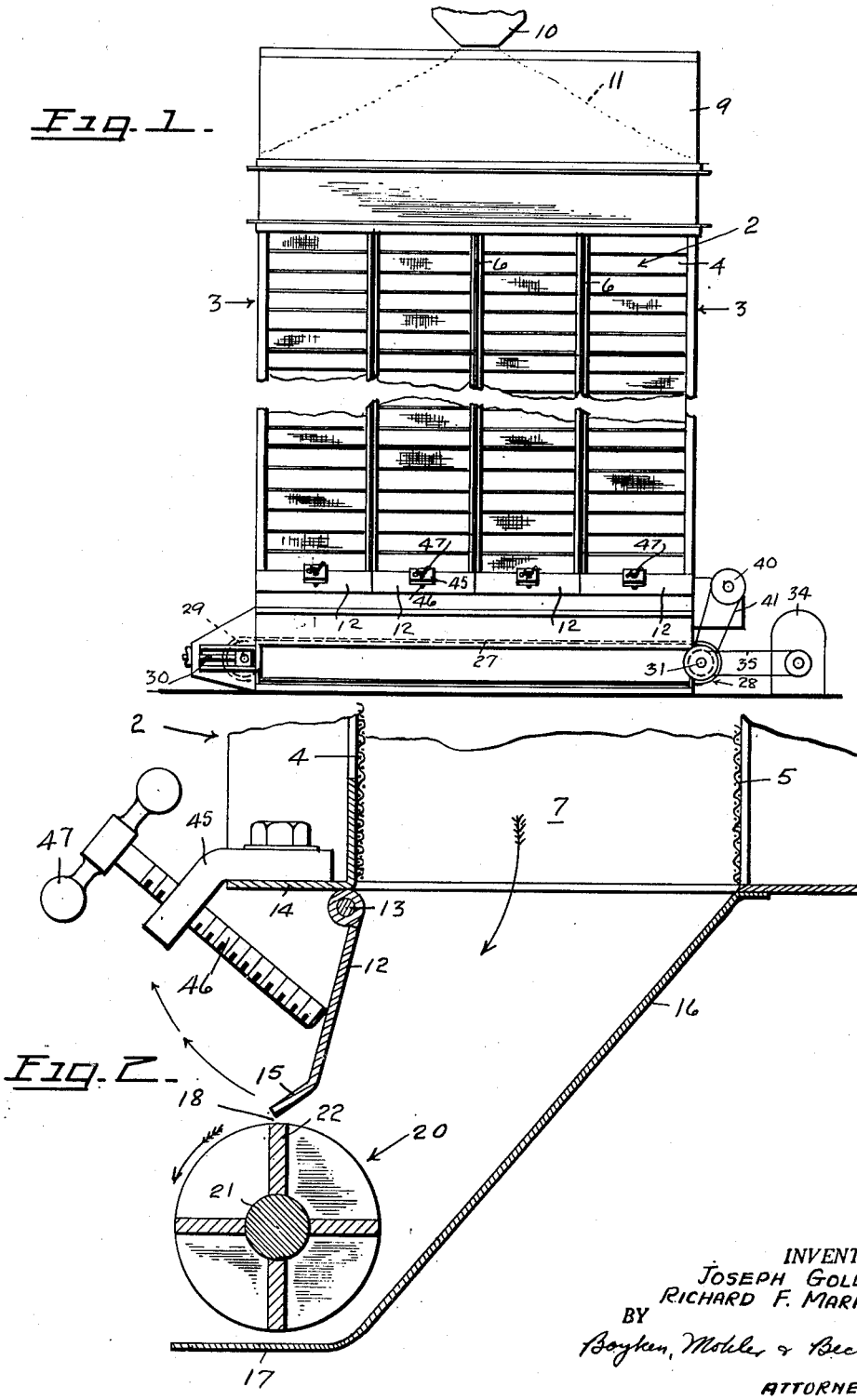
INVENTORS
JOSEPH GOLLBACH
RICHARD F. MARKEN
BY
Boyken, Mohler & Beckley
ATTORNEYS

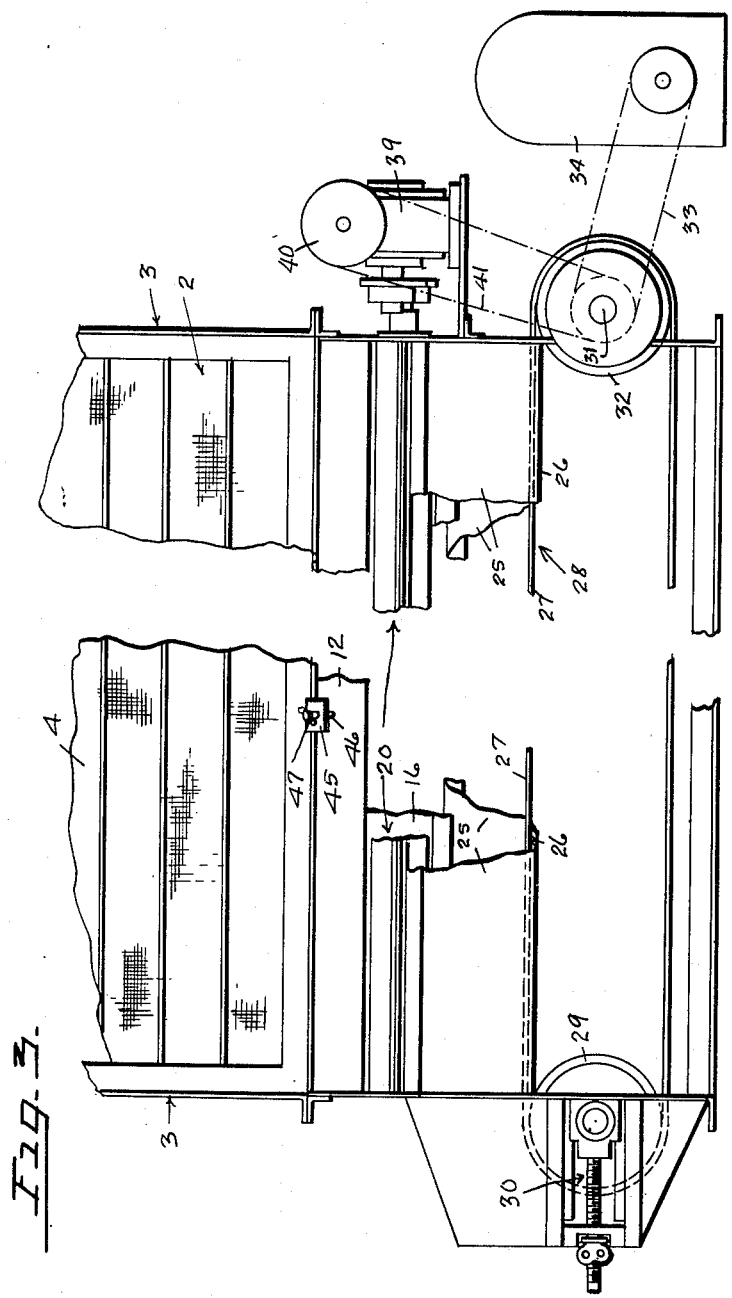

INVENTORS
JOSEPH GOLLBACH
RICHARD F. MARKEN
BY
ATTORNEYS

Patented May 8, 1951

2,552,093

UNITED STATES PATENT OFFICE 2,552,093

ROTARY DISCHARGE MECHANISM FOR DRIERS

Joseph Gollbach, Sacramento, and Richard F. Marken, San Leandro, Calif., assignors to H. M. Shanzer Co., San Francisco, Calif.

Application June 28, 1946, Serial No. 680,254

3 Claims. (Cl. 222—312)

This invention relates to a drier adapted for drying material such as rice paddy, beans, corn, etc., and in which the said material is adapted to move downwardly by gravity between spaced perforated walls or screens, while warm air is caused to pass through the screens and the body of material between them.

Driers of the above type customarily are vertically extending towers having two opposite sides, each of which comprises a pair of opposed vertically disposed screens or perforated walls. Two imperforate end walls form the remaining sides of the tower. Said sides and end walls define the sides of a central warm air chamber supplied from below with warm air for passage through the walls that are of screen. These screen walls may each be divided by vertical partitions into vertical passageways for the material to be dried, and the material is simultaneously fed to the upper ends of all of said passageways from a feed hopper into which a supply of the material is fed, such feed being generally at a point about centrally over the warm air chamber. The bottom of the hopper that conducts the material to the passageways extends over the top end of the warm air chamber.

Heretofore, it has been customary to provide means at the lower ends of the passageways through which the material descends to facilitate the discharge of the dried material from said ends and into a trough provided with a screw conveyer for conveying the dried material away to an elevation or to any other desired point for further processing.

Several objections to the foregoing system are the fact that there has been no adequate control of the discharge of material from the several passageways and screw conveyors have failed to keep the troughs clean of seeds, and other undesirable material. Quite frequently, straw and other undesirable material would tend to choke off the discharge of material from certain of the passageways, with the result that the material in the passageways would not move downwardly at a uniform rate of speed, and consequently the drying would not be uniform.

In the case of rice paddy, the straw and chaff tends to move to the end passageways of the several that are in each of the two side walls, and through which the warm air is passed.

One of the main objects of the present invention is the provision of means to enable adjusting the flow of material to be dried through any one or more of the passageways independently of the remaining passageways and which means coacts with a rotor that functions to facilitate the withdrawal of the material from the passageways at any desired rate of speed. By this means the volume of flow as well as the rate of flow of the dried material from the lower ends of the passageways is accurately controlled.

Another object of the invention is the provision of means for quickly and easily clearing the lower ends of any of the passageways of straw, chaff, sticks or any other material likely to interfere with the proper discharge of material from the passageways.

A still further object of the invention is the provision of means for quickly, cleanly and efficiently conducting material discharge from the passageways in the drier away from said passageways.

An added object is the provision of simple means for controlling the discharge of material from the passageways in a drier of the character described in such a manner that material of different kinds can be dried in the same drier in the most efficient manner for each different material. Some material dries faster than others and some material is particularly difficult to control because it tends to separate into streams of different physical characteristics upon being fed into the feed hopper at the upper ends of the passageways. With the present invention, the movement of the material downwardly during drying can be controlled so that such movement may be very fast or very slow or at any desired rate, and furthermore, the movement in one or more of the passageways can be different from that in others, or the rate of movement in each passageway may be different from that in any other without modifying the rate of speed of the means that function to facilitate the withdrawal of the material from all of said passageways, and also the movement of material in all passageways may be controlled to be the same irrespective of differences in the physical characteristics of the material in different passageways.

Other objects and advantages will appear in the description and drawings.

In the drawings, Fig. 1 is a side elevational view of a drier that embodies the present invention.

Fig. 2 is an enlarged sectional view of the rotor, plates and flow control adjustment means.

Fig. 3 is an enlarged elevational fragmentary view partly broken away and partly diagrammatic of the lower end of the drier.

Figure 4:
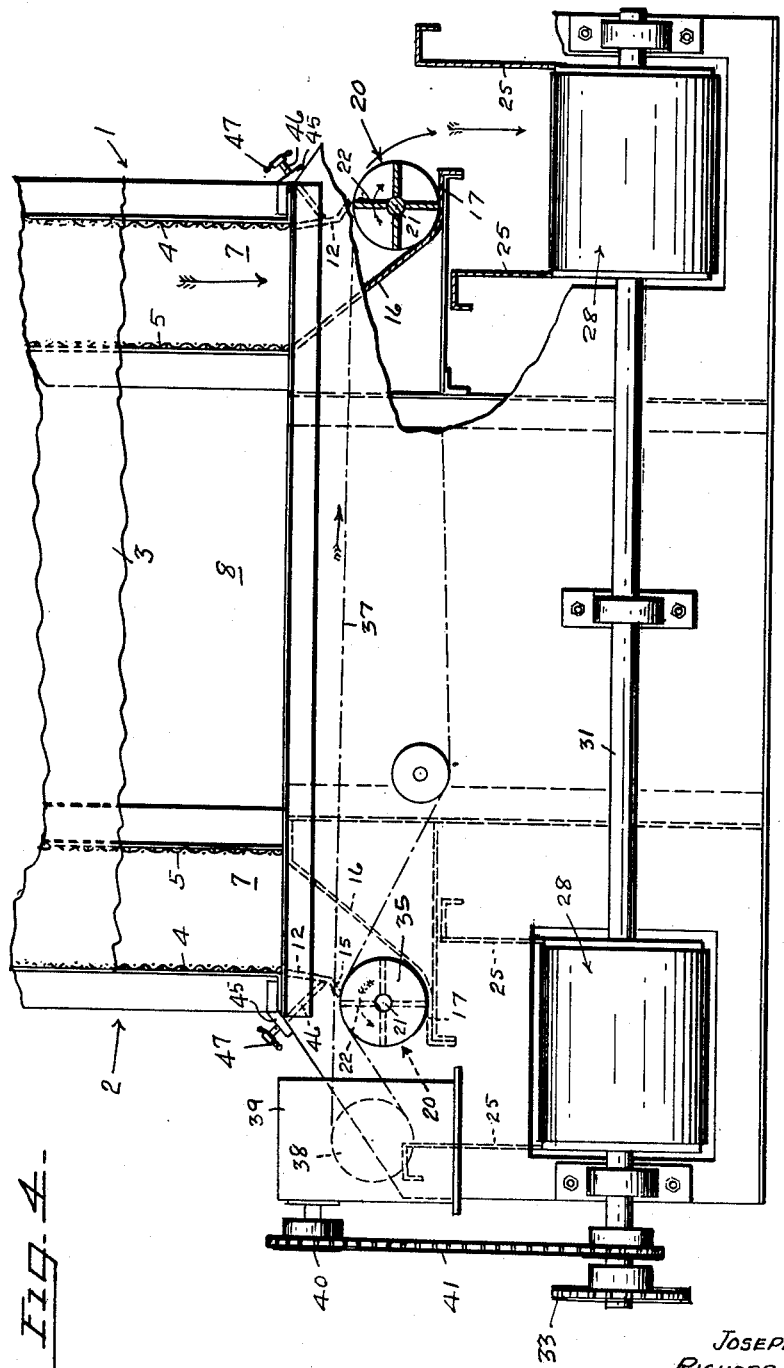
Fig. 4 is a fragmentary part elevational and part sectional view of one end of the drier with the end walls at the ends of the screen walls removed to show the screens.

In detail, a drier of the general type herein described comprises a tower having two opposite sides, generally designated 1, 2 (Fig. 4) and two similar, imperforate ends 3.

Each of the said side walls comprises a pair of spaced vertical screens 4, 5, the outer screens being designated 4 and the inner ones 5.

These sides 1, 2 may be divided by partitions 6

(Fig. 1) into a plurality of adjacent vertically extending passageways 7, if desired, although it is obvious that a drier may have merely one passageway along each of its two opposite sides, each of which is no wider than the distance between each adjacent pair of partitions.

By the foregoing structure, the sides 1, 2 and the ends 3 define the lateral walls of a central warm air chamber 8 (Fig. 4). Warm air is forced into this chamber from below by any suitable means (not shown) and this air passes through the perforated walls or screens 5, 4 in succession and through any material between said screens, drying said material.

The material to be dried is deposited in a feed hopper 9 that is at the upper end of the drier, and the bottom of which hopper closes the upper end of the central warm air chamber 8, and extends slantingly to the upper ends of the passageways 7. A central feed spout 10 (Fig. 1) usually discharges the material to be dried into said hopper 9, and the level of such material generally slopes away from the spout as indicated by dotted lines 11.

The lower ends of passageways 7 are open, and depending plates 12 are pivotally secured along their upper edges by pivots 13 (Fig. 2) to the frame members 14 of the drier for swinging on said pivots. There is a separate plate 12 for each passageway 7, and said plates are horizontally elongated and rectangular with their lower marginal portions 15 bent slightly outwardly in direction outwardly of the drier.

Extending slantingly downwardly from the lower ends of screens 5 and to points below the plates 12 are rigid plates 16 (Fig. 2) secured to the framework of the drier. At the lower end of the inclined portion of each plate 16, said plates have terminating marginal portions 17 extending horizontally in direction away from the center of the drier. The portions 17 are spaced a substantial distance below the portions 15 of plates 12, and the terminating lower edges of plates 12 and the outer edges of plates 16 define horizontally elongated opposite edges of horizontally elongated laterally directed discharge openings 18 for material moving downwardly by gravity through passageways 7.

Extending longitudinally of said discharge openings along each side of the drier and from end to end of the drive, is a horizontally extending rotor generally designated 20 (Fig. 4) supported for rotation in suitable bearings on the ends of the drier. Each rotor comprises a central shaft 21 having vanes 22 extending radially therefrom, said vanes being horizontally elongated and parallel with shaft 21 (Figs. 2, 3, 4).

The rotors 20 are preferably disposed over the marginal portions 17 of plates 16, and the lower edges of plates 12 terminate about directly over the rotors and close to the path of the outer edges of vanes 22 when the rotors are rotated. Thus the material to be dried will descend by gravity to the rotors 20 and adjacent the inner sides of plate 12, tending to swing said plates outwardly.

Below each of the rotors 20 is a horizontally elongated channel member having sides 25 and a bottom 26 (Figs. 3, 4) on which is slidably supported the upper run 27 of a horizontally extending belt conveyer 28.

This run 27 of each conveyor extends the full length of each rotor 20 and through openings in the end walls 37 of the drier so that any material discharged past the rotors 20 will fall onto the upper runs 27 of the conveyors and will be carried over pulley 29 at one end for discharge from the conveyors.

A suitable pulley take-up mechanism 30 is provided for taking up any slack in each of the conveyors (Fig. 3) and the shaft 31 that carries the pulleys 32 at the ends of the conveyors opposite pulleys 29 is driven by any suitable driving connection 33 by a variable speed motor 34.

Sprockets 35, respectively on rotor shafts 21, are connected by a chain 37 for rotation of said rotors in directions for movement of the vanes in direction outwardly of the drier and directly past the lower edges of plates 12 when said chain 37 is actuated in the direction of the arrow (Fig. 4). Said chain 37 extends over a sprocket 38 on the driven shaft of a gear box 39 for so actuating said chain, and the drive shaft of said gear box carries a sprocket 40 that connects by a chain 41 with a sprocket on shaft 31 (Fig. 3) whereby the rotors will be driven by the motor 34. The gear box constitutes a conventional reduction unit for effecting rotation of the rotors 20 at any desired speed, while conveyor 28 driven at the desired speed by the variable speed motor 34.

As has already been pointed out, the material in passageways 7 tends to swing the plates or gates 12 outwardly. However, free flow of material out of the discharge openings is impeded by the rotors 20 and gates 12, but rotation of each rotor 20 in a direction for movement of the vanes past the lower edge of each plate 12 as indicated in Fig. 2 will result in a controlled continuous flow of material out of the openings 18, assuming the material in all of the passageways is uniform. The rotors carry the material over them and past the plates 12.

Secured on the drier frame outwardly of each plate 12 is a support 45 formed with a threaded opening through which a stop screw 46 extends, each screw having a knob or handle 47 at its outer end for manipulation of the screw. The inner end of each screw is adapted to engage the outer side of each plate 12 for controlling the degree that each plate may swing outwardly. The adjustment is such that any one or more of the plates 12 may swing from a position as seen in Fig. 2 in which the minimum volume of material may be carried therepast to a fully open position in which the plates 12 are practically horizontal and a very large volume of material is permitted to flow through the opening.

In operation, assuming the physical characteristic of the material in the end passageways is such that there is a tendency to choke off or reduce the normal flow of the material from the intermediate passageways, the operator may retract the screws 46 that are adapted to engage the plates 12 of the end passageways. The pressure of the material will cause the plates 12 to swing against the retracted screws thus increasing the effective areas of the openings 18 and the material will flow from the end passageways at the desired rate. The enlarged openings permit the straw, chaff, etc., to flow through without clogging said openings.

Furthermore, in the event any of the discharge openings should become clogged by material or by the lodgement of any foreign material, by retracting the screw 46 that functions to limit the outward movement of the plate at such opening, the obstruction is quickly cleared.

When the operation of each drier ceases, it is customary to empty the passageways without regard to the rate of flow, inasmuch as the last charge of material in the passageways cannot be properly dried when the level falls below the upper edges of the screens. By manipulating the screws 46 to permit all of the plates 12 to swing to fully open positions, the passageways are quickly emptied, whereas if the emptying process were to be dependent upon the normal rate of discharge, a relatively long time would be required.

The provision of the channel and belt conveyor below the discharge openings 18 insures against collection of seeds and undesirable foreign material in the channel. Also, the dried material discharged into the channel and onto the conveyor is more satisfactorily handled than by the use of conventional screw conveyors.

It is to be understood that the detailed description and drawings are not to be considered restrictive of the invention, but merely illustrative of a preferred form thereof.

We claim:

1. In a rice and grain drier of the type having a pair of spaced, opposed, vertically extending side walls for gravitational downward movement therebetween of the material to be dried, the improvement comprising, a horizontally elongated generally vertically disposed first plate, means for pivotally suspending said first plate from its upper edge adjacent the lower edge of one side wall of said pair for swinging of said first plate about a horizontal axis at its upper edge, a rigid second plate extending slantingly downwardly from the lower edge of the other side wall of said pair to a point spaced substantially directly below said one side wall and below said first plate, an extension on said second plate extending from its lower edge horizontally outwardly relative to the downwardly projected area between said side walls, a horizontally elongated rotor supported between the lower edge of said first plate and said extension for rotation about its horizontal axis, said rotor including radially extending horizontally elongated vanes spaced from the lower edge of said first plate and said extension, the axis of rotation of said rotor being between said extension and the lower edge of said first plate and in a vertical plane spaced slightly outwardly of said downwardly projected area between said sidewalls, and stop means for limiting the outward swinging of said first plate.

2. In a rice and grain drier of the type having a pair of spaced, opposed, vertically extending side walls for gravitational downward movement therebetween of the material to be dried, the improvement comprising, a horizontally elongated generally vertically disposed first plate, means for pivotally suspending said first plate from its upper edge adjacent the lower edge of one side wall of said pair for swinging of said first plate about a horizontal axis, at its upper edge, a rigid second plate extending slantingly downwardly from the lower edge of the other side wall of said pair to a point spaced substantially directly below said one side wall and below said first plate, an extension on said second plate extending from its lower edge horizontally outwardly relative to the downwardly projected area between said side walls, a horizontally elongated rotor supported between the lower edge of said first plate and said extension for rotation about its horizontal axis, said rotor including radially extending horizontally elongated vanes spaced from the lower edge of said first plate and said extension, the axis of rotation of said rotor being between said extension and the lower edge of said first plate and in a vertical plane spaced slightly outwardly of said downwardly projected area between said sidewalls, and stop means for limiting the outward swinging of said first plate, the horizontally extending lower marginal portion of said first plate being slanted outwardly relative to said downwardly projected area between said sidewalls.

3. In a rice and grain drier of the type having a pair of spaced, opposed, vertically extending side walls for gravitational downward movement therebetween of the material to be dried, the improvement comprising, a horizontally elongated generally vertically disposed first plate, means for pivotally suspending said first plate from its upper edge adjacent the lower edge of one side wall of said pair for swinging of said first plate about a horizontal axis, at its upper edge, a rigid second plate extending slantingly downwardly from the lower edge of the other side wall of said pair to a point spaced substantially directly below said one side wall and below said first plate, an extension on said second plate extending from its lower edge horizontally outwardly relative to the downwardly projected area between said side walls, a horizontally elongated rotor supported between the lower edge of said first plate and said extension for rotation about its horizontal axis, said rotor including radially extending horizontally elongated vanes spaced from the lower edge of said first plate and said extension, the axis of rotation of said rotor being between said extension and the lower edge of said first plate and in a vertical plane spaced slightly outwardly of said downwardly projected area between said sidewalls, and stop means for limiting the outward swinging of said first plate, the horizontally extending lower marginal portion of said first plate being slanted outwardly relative to said downwardly projected area between said sidewalls, and means for rotating said rotor for movement of the uppermost vanes outwardly relative to said downwardly projected area between said side walls, said marginal portion of said first plate being positioned in a plane substantially tangential to the path of travel of the outer edges of said vanes when said downwardly projected area between said sidewalls is filled with said material.

JOSEPH GOLLBACH.
RICHARD F. MARKEN.

REFERENCES CITED

The following references are of record in the file of this patent:

UNITED STATES PATENTS

| Number | Name | Date |
|---|---|---|
| 775,350 | Gerard | Nov. 22, 1904 |
| 900,790 | Smith | Oct. 13, 1908 |
| 1,054,334 | Brantingham | Feb. 25, 1913 |
| 1,084,732 | Dennis | Jan. 20, 1914 |
| 1,150,996 | Carr | Aug. 24, 1915 |
| 1,219,816 | French | Mar. 20, 1917 |
| 1,482,812 | Roberts | Feb. 5, 1924 |
| 1,673,241 | Hatfield | June 12, 1928 |
| 1,941,499 | Siems | Jan. 2, 1934 |
| 2,046,603 | Baumgardner | July 7, 1936 |